United States Patent
Yu et al.

(10) Patent No.: US 11,101,661 B2
(45) Date of Patent: Aug. 24, 2021

(54) DEVICE FOR SUPPRESSING POTENTIAL INDUCED DEGRADATION AND SYSTEM

(71) Applicant: SUNGROW POWER SUPPLY CO., LTD., Anhui (CN)

(72) Inventors: Yanfei Yu, Anhui (CN); Hua Ni, Anhui (CN); Zongjun Yang, Anhui (CN); Shangfang Dai, Anhui (CN)

(73) Assignee: SUNGROW POWER SUPPLY CO., LTD., Anhui (CN)

( * ) Notice: Subject to any disclaimer, the term of this patent is extended or adjusted under 35 U.S.C. 154(b) by 293 days.

(21) Appl. No.: 15/474,086

(22) Filed: Mar. 30, 2017

(65) Prior Publication Data
US 2017/0331294 A1     Nov. 16, 2017

(30) Foreign Application Priority Data

May 11, 2016  (CN) .......................... 201610316246.9

(51) Int. Cl.
*H02J 1/10*  (2006.01)
*H02J 3/38*  (2006.01)
(Continued)

(52) U.S. Cl.
CPC .............. *H02J 3/383* (2013.01); *H01F 38/42* (2013.01); *H02M 3/005* (2013.01); *H02M 3/24* (2013.01);
(Continued)

(58) Field of Classification Search
CPC .......... H02J 3/383–385; H02J 2300/24; H02S 40/30; H02S 40/32; H02S 40/38;
(Continued)

(56) References Cited

U.S. PATENT DOCUMENTS

2010/0263711 A1* 10/2010 Kanai ....................... G05F 1/67
                                                      136/246
2014/0354170 A1* 12/2014 Gredler .................. H05B 45/50
                                                      315/224
(Continued)

FOREIGN PATENT DOCUMENTS

CN   203697986 U   7/2014
CN   103973217 A   8/2014
(Continued)

OTHER PUBLICATIONS

Khan et al., Three phase six-switch PWM buck rectifier with power factor improvement, 2013 (Year: 2013).*
(Continued)

*Primary Examiner* — Rexford N Barnie
*Assistant Examiner* — Rasem Mourad
(74) *Attorney, Agent, or Firm* — Cantor Colburn LLP

(57) ABSTRACT

Provided are a device for suppressing potential induced degradation and a system. The device includes a rectification module, a non-isolated voltage conversion module and at least one capacitor. An input terminal of the rectification module is connected to an output terminal of a converter, the rectification module is configured to rectify an alternating current outputted by the converter into a direct current, the non-isolated voltage conversion module is configured to perform voltage conversion on the direct current outputted by the rectification module, and the voltage conversion is boost conversion or voltage reverse conversion. The capacitor is connected in parallel with an output terminal of the direct current, and either a positive electrode or a negative electrode of the capacitor is grounded.

5 Claims, 9 Drawing Sheets

(51) Int. Cl.
   *H02M 3/335* (2006.01)
   *H02M 7/00* (2006.01)
   *H01F 38/42* (2006.01)
   *H02M 3/00* (2006.01)
   *H02M 3/24* (2006.01)
   *H02M 7/06* (2006.01)
   *H02M 7/217* (2006.01)

(52) U.S. Cl.
   CPC ............. *H02M 3/335* (2013.01); *H02M 7/00* (2013.01); *H02M 7/06* (2013.01); *H02M 7/217* (2013.01); *Y02E 10/56* (2013.01)

(58) Field of Classification Search
   CPC ... H02M 3/24; H02M 3/335; Y02E 10/50–58; Y02E 10/563; H01F 38/42; H01F 2038/426
   See application file for complete search history.

(56) References Cited

U.S. PATENT DOCUMENTS

| | | | |
|---|---|---|---|
| 2015/0207456 A1* | 7/2015 | Han | H02S 40/32 136/244 |
| 2015/0249389 A1* | 9/2015 | Cummings | H02M 3/335 363/21.12 |
| 2015/0311802 A1* | 10/2015 | Loke | H02P 23/00 318/400.3 |
| 2016/0036339 A1* | 2/2016 | Kikuchi | H02M 3/33523 363/21.14 |
| 2016/0116925 A1 | 4/2016 | Freeman et al. | |
| 2018/0083571 A1* | 3/2018 | Xu | H02S 40/30 |

FOREIGN PATENT DOCUMENTS

| | | |
|---|---|---|
| CN | 104201981 A | 12/2014 |
| CN | 104300584 A | 1/2015 |
| CN | 204168221 U | 2/2015 |
| CN | 104393833 A | 3/2015 |
| CN | 104901618 A | 9/2015 |
| EP | 3291441 A1 | 3/2018 |
| WO | 2016188433 A1 | 12/2016 |

OTHER PUBLICATIONS

Tony Alfrey, Flyback Converter for High Voltage Capacitor Charging, Oct. 5, 2014 (Year: 2014).*
Indian First Office Action corresponding to Application No. 201714011487; dated Apr. 30, 2019.
Extended European Search Report for corresponding Application No. 17163843.0-1809; dated Oct. 2, 2017.
SIPO First Office Action corresponding to CN Application No. 201610316246.9; dated Aug. 3, 2017.
EPO Office Action corresponding to EP Patent Application No. 17163843.0; dated Mar. 17, 2020.
Qiao, et al., "A general three-phase PFC controller for rectifiers with a series-connected dual-boost topology"; Industry Applications, IEEE Transactions on Power Electronics, vol. 17, No. 6; Nov. 2002; pp. 925-934.

* cited by examiner

DEVICE FOR SUPPRESSING POTENTIAL INDUCED DEGRADATION AND SYSTEM

CROSS REFERENCE TO RELATED APPLICATION

The present application claims the priority to Chinese Patent Application No. 201610316246.9, titled "DEVICE FOR SUPPRESSING POTENTIAL INDUCED DEGRADATION AND SYSTEM", filed on May 11, 2016 with the State Intellectual Property Office of the PRC, which is incorporated herein by reference in its entirety.

TECHNICAL FIELD

The present disclosure relates to the field of photovoltaic power generation technology, and in particular to a device for suppressing potential induced degradation and a system.

BACKGROUND

Potential induced degradation (PID) refers to a phenomenon of output characteristics degradation due to potential induced, which is characterized by some types of photovoltaic panels at a specific voltage to earth. The PID effect will result in the decrease of an output power of a photovoltaic system.

Therefore, in order to prevent or weaken the PID effect, it is necessary to compensate for the voltage to earth of the photovoltaic system to make a bias voltage of the photovoltaic panel relative to the ground in a range without the PID effect.

In the conventional technology, a voltage compensation device is added to the direct current side of the photovoltaic system. For a photovoltaic system with multiple photovoltaic inverters connected in parallel on the alternating current side, the devices need to be added to the direct current side of all the photovoltaic inverters, thereby resulting in a high cost. In addition, a circulating current may occur among the multiple voltage compensation devices, which affects the reliability of the photovoltaic system.

Accordingly, a device for suppressing potential induced degradation and a system need to be provided by those skilled in the art to prevent or weaken the PID effect of photovoltaic panels.

SUMMARY

To solve the technical problems in the conventional technology, a device for suppressing potential induced degradation and a system are provided according to the present disclosure, to prevent or weaken the PID effect of photovoltaic panels.

A device for suppressing potential induced degradation is provided according to an embodiment of the present disclosure. The device is connected between an alternating current output terminal of a converter and a grid-connected power frequency transformer in a photovoltaic system. The device includes a rectification module, a non-isolated voltage conversion module and at least one capacitor. An input terminal of the rectification module is connected to an output terminal of the converter, the rectification module is configured to rectify an alternating current outputted by the converter into a direct current, the non-isolated voltage conversion module is configured to perform voltage conversion on the direct current outputted by the rectification module, and the voltage conversion is boost conversion or voltage reverse conversion. Or, an input terminal of the non-isolated voltage conversion module is connected to an output terminal of the converter, the non-isolated voltage conversion module is configured to perform voltage conversion on an alternating current outputted by the converter, the voltage conversion is boost conversion, and the rectification module is configured to rectify an alternating current outputted by the non-isolated voltage conversion module into a direct current. The capacitor is connected in parallel with an output terminal of the direct current, and either a positive electrode or a negative electrode of the capacitor is grounded.

Preferably, the non-isolated voltage conversion module is any one of a Boost circuit, a Buck-boost circuit, a Cuk circuit, a Sepic circuit and a Zeta circuit, in a case that the input terminal of the rectification module is connected to the output terminal of the converter.

Preferably, an output terminal of a Buck-boost circuit is connected in parallel with the capacitor in a case that the non-isolated voltage conversion module is the Buck-boost circuit, or an output terminal of a Boost circuit is connected in parallel with the capacitor in a case that the non-isolated voltage conversion module is the Boost circuit. An output voltage of the non-isolated voltage conversion module is controlled to make a voltage to earth of the photovoltaic system negative, in a case that the positive electrode of the capacitor is grounded. The output voltage of the non-isolated voltage conversion module is controlled to make the voltage to earth of the photovoltaic system positive, in a case that the negative electrode of the capacitor is grounded.

Preferably, in a case that the input terminal of the rectification module is connected to the output terminal of the converter, the non-isolated voltage conversion module is an isolated DC-DC converter based on a high-frequency transformer. And the isolated DC-DC converter includes any one of a forward converter, a fly-back converter, an LLC converter, a half-bridge isolated converter, a full-bridge isolated converter and a push-pull converter. An input terminal and an output terminal of the isolated DC-DC converter are connected.

Preferably, in a case that the isolated DC-DC converter is the fly-back converter: an input negative electrode and an output positive electrode of the fly-back converter are connected, an output terminal of the fly-back converter is connected in parallel with the capacitor, and the negative electrode of the capacitor is grounded; or an input positive electrode and an output negative electrode of the fly-back converter are connected, an output terminal of the fly-back converter is connected in parallel with the capacitor, and the positive electrode of the capacitor is grounded.

Preferably, in a case that the non-isolated voltage conversion module is connected to the output terminal of the converter, the non-isolated voltage conversion module is a power frequency transformer, both a primary side and a secondary side of the power frequency transformer have Y-type structures, a neutral point of the primary side is connected with a neutral point of the secondary side, the primary side is connected to a power grid, and the secondary side is connected to the input terminal of the rectification module. A boosting ratio of the power frequency transformer is adjusted to make a voltage to earth of the photovoltaic system negative, in a case that the positive electrode of the capacitor is grounded. The boosting ratio of the power frequency transformer is adjusted to make the voltage to earth of the photovoltaic system positive, in a case that the negative electrode of the capacitor is grounded.

Preferably, the rectification module is an uncontrolled rectification bridge.

A device for suppressing potential induced degradation is provided according to an embodiment of the disclosure. The device is connected between an alternating current output terminal of a converter and a grid-connected power frequency transformer in a photovoltaic system. The device includes a rectification module, a non-isolated voltage conversion module and at least one capacitor. The rectification module and the non-isolated voltage conversion module are implemented by a PWM rectifier, an input terminal of the PWM rectifier is connected to an output terminal of the converter, the PWM rectifier is configured to rectify an alternating current outputted by the converter into a direct current and perform voltage conversion on the alternating current, and the voltage conversion is boost conversion. The capacitor is connected in parallel with an output terminal of the direct current, and either a positive electrode or a negative electrode of the capacitor is grounded.

A photovoltaic system is provided according to an embodiment of the disclosure. The photovoltaic system includes the above device for suppressing potential induced degradation, and a PV array, a converter and a transformer. The PV array is connected to an input terminal of the converter, an output terminal of the converter is connected to an input terminal of the transformer, and an output terminal of the transformer is connected to a power grid or a load.

Preferably, the number of converters is one or the number of converters is two or more. In a case that the number of the converters is two or more, an input terminal of each of the converters is connected to one PV array, output terminals of all the converters are connected in parallel, and then the output terminals of all the converters are connected with the input terminal of the transformer.

Compared with the conventional technology, the present disclosure has at least the following advantages.

A highest potential point or a lowest potential point can be provided to the photovoltaic system. For example, in a case that the positive electrode of the capacitor is grounded, the highest potential of the photovoltaic system is zero. In a case that the negative electrode of the capacitor is grounded, the lowest potential of the photovoltaic system is zero. In such way, it can be achieved that the voltage to earth of the photovoltaic system is completely positive or negative, and for a photovoltaic system with different types of photovoltaic modules, the PID phenomenon can be effectively prevented by using the device for suppressing potential induced degradation according to the present disclosure. In addition, there is no load in the device. Therefore, the power consumption is very low, the capacity can be small, and the cost is low.

BRIEF DESCRIPTION OF THE DRAWINGS

To illustrate technical solutions according to embodiments of the present disclosure or in the conventional technologies more clearly, drawings to be used in the descriptions of the embodiments or the conventional technologies are described briefly hereinafter. Apparently, the drawings described hereinafter are only for some embodiments of the present disclosure, and other drawings may be obtained by those skilled in the art based on those drawings without creative efforts.

DETAILED DESCRIPTION OF THE EMBODIMENTS

To facilitate those skilled in the art to better understand technical solutions of the present disclosure, the technical solutions of the embodiments of the present disclosure are illustrated clearly and completely in conjunction with the following drawings of the embodiments of the present disclosure. Apparently, the described embodiments are merely a few rather than all of the embodiments of the present disclosure. All other embodiments obtained by those skilled in the art based on the embodiments of the present disclosure without creative efforts shall fall within the protection scope of the present disclosure.

A first embodiment of a device is described below.

Figure 1A:
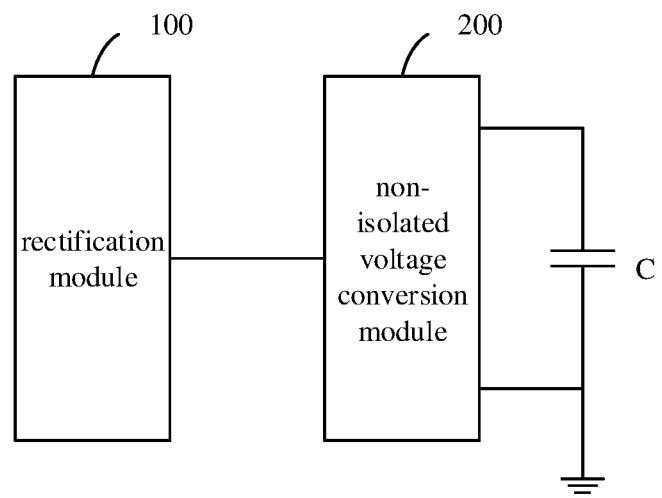
FIG. 1A is a schematic diagram of a device according to a first embodiment of the present disclosure.
Figure 1B:
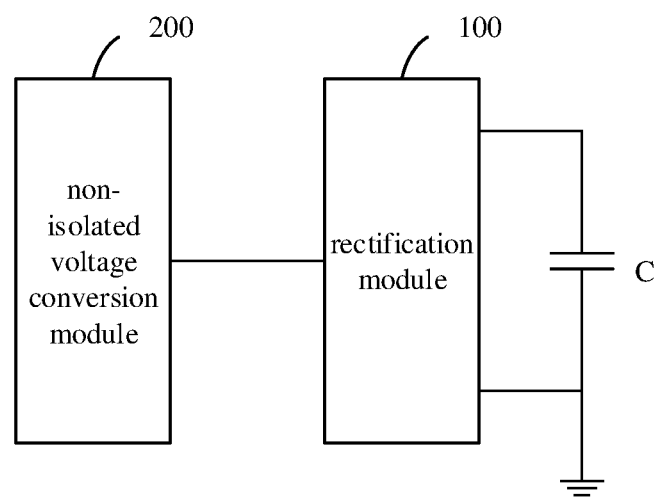
FIG. 1B is another schematic diagram of a device according to a first embodiment of the present disclosure.

Reference is made to FIG. 1A and FIG. 1B, which are schematic diagrams of a device for suppressing potential induced degradation according to a first embodiment of the present disclosure. The device for suppressing potential induced degradation according to the embodiment is connected between an alternating current output terminal of a converter and a grid-connected power frequency transformer in a photovoltaic system. The device includes a rectification module 100, a non-isolated voltage conversion module 200 and at least one capacitor C.

As shown in FIG. 1A, an input terminal of the rectification module 100 is connected to an output terminal of the converter, and the rectification module 100 is configured to rectify an alternating current outputted by the converter into a direct current. The non-isolated voltage conversion module 200 is configured to perform voltage conversion on the direct current outputted by the rectification module, and the voltage conversion is boost conversion or voltage reverse conversion.

Alternatively, as shown in FIG. 1B, an input terminal of the non-isolated voltage conversion module 200 is connected to an output terminal of the converter, the non-isolated voltage conversion module 200 is configured to perform voltage conversion on an alternating current outputted by the converter, and the voltage conversion is boost conversion. The rectification module 100 is configured to rectify an alternating current outputted by the non-isolated voltage conversion module into a direct current.

The capacitor C is connected in parallel with an output terminal of the direct current, and either a positive electrode or a negative electrode of the capacitor C is grounded.

It can be understood that the converter may be an inverter. In a case that a ripple voltage is not taken into account, PV+ and PV− of a direct current of the converter are generally symmetrical with respect to a point N, i.e., a voltage of PV+ relative to N is the same as a voltage of N relative to PV−. N is an alternating current neutral point potential, and is generally formed by a midpoint of Y-type windings on the primary side of a grid-connected transformer on an alternating current side.

It should be noted that the non-isolated voltage conversion module 200 implements the function of boosting or reversing a voltage, but the function can not be reducing the voltage. Since a voltage range outputted on the direct current side is smaller than a voltage range of a power grid in a case that the non-isolated voltage conversion module 200 implements the function of reducing the voltage, a highest point or a lowest point of the voltage can not be formed. It should be noted that, both in FIG. 1A and FIG. 1B, the negative electrode of the capacitor C is grounded. It can be understood that the positive electrode of the capacitor C may be grounded. In a case that the negative electrode of the capacitor C is grounded, a voltage to earth of the photovoltaic system is completely positive. In a case that the positive electrode of the capacitor C is grounded, the voltage to earth of the photovoltaic system is completely negative.

It can be understood that the device according to the embodiment can provides a highest potential point or a lowest potential point to the photovoltaic system. For example, in a case that the positive electrode of the capacitor is grounded, the highest potential of the photovoltaic system is zero. In a case that the negative electrode of the capacitor is grounded, the lowest potential of the photovoltaic system is zero. When a PID phenomenon occurs, an output voltage of the photovoltaic system can be forced to be higher than zero or lower than zero. In such way, the unipolarity of the output voltage of the photovoltaic system can be achieved, thereby achieving a function of resisting the PID. In addition, there is no load in the device. Therefore, the power consumption is very low, the capacity can be small, and the cost is low.

It should be noted that the non-isolated voltage conversion module can be implemented in a variety of ways. Hereinafter specific implementations will be described in detail in conjunction with drawings.

A second embodiment of a device is described below.

Figure 2A:
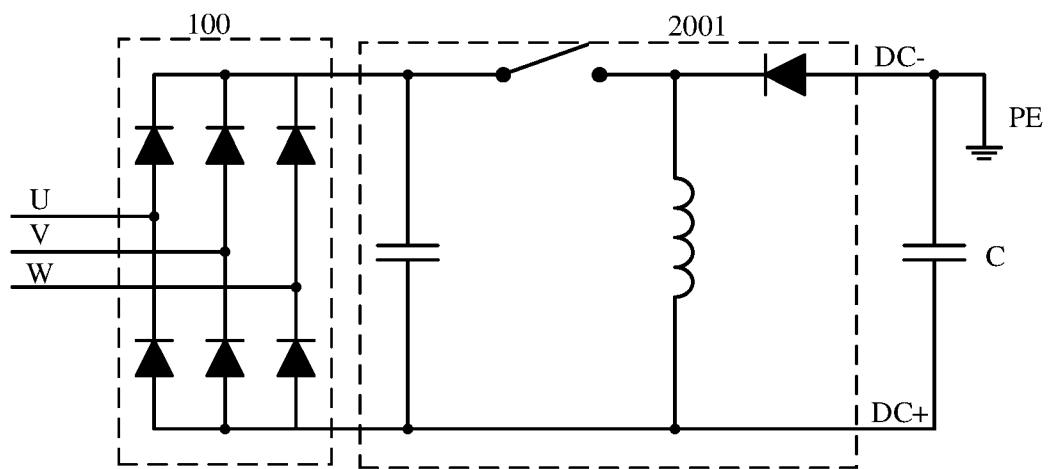
FIG. 2A is a schematic diagram of a device according to a second embodiment of the present disclosure.
Figure 2B:
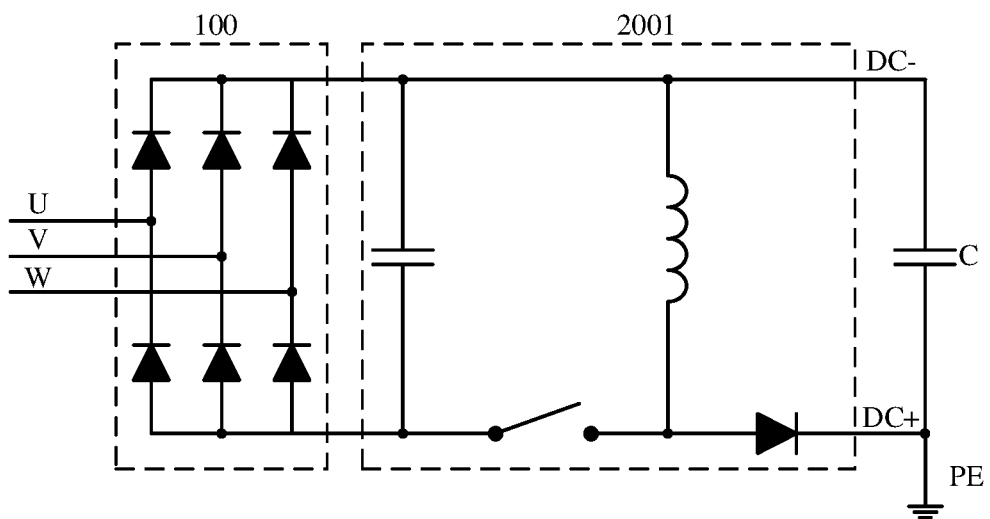
FIG. 2B is another schematic diagram of a device according to a second embodiment of the present disclosure.

Reference is made to FIG. 2A and FIG. 2B, which are schematic diagrams of a device according to the second embodiment of the present disclosure. In the embodiment, the non-isolated voltage conversion module is any one of a Boost circuit, a Buck-boost circuit, a Cuk circuit, a Sepic circuit and a Zeta circuit, in a case that the input terminal of the rectification module 100 is connected to the output terminal of the converter.

It should be noted that, in the embodiment, the description is made by taking a case that the rectification module 100 is an uncontrolled rectification bridge as an example. As shown in FIG. 2A, the uncontrolled rectification bridge is a three phase full-bridge circuit.

In the embodiment, the description is made by taking a case that the non-isolated voltage conversion module is a Buck-boost circuit 2001 as an example. An output terminal of the Buck-boost circuit 2001 is connected in parallel with the capacitor C. An output voltage of the non-isolated voltage conversion module is controlled to make a voltage to earth of the photovoltaic system negative, in a case that the positive electrode of the capacitor C is grounded. As shown in FIG. 2B, the output voltage of the non-isolated voltage conversion module is controlled to make the voltage to earth of the photovoltaic system positive, in a case that the negative electrode of the capacitor is grounded.

Figure 3A:
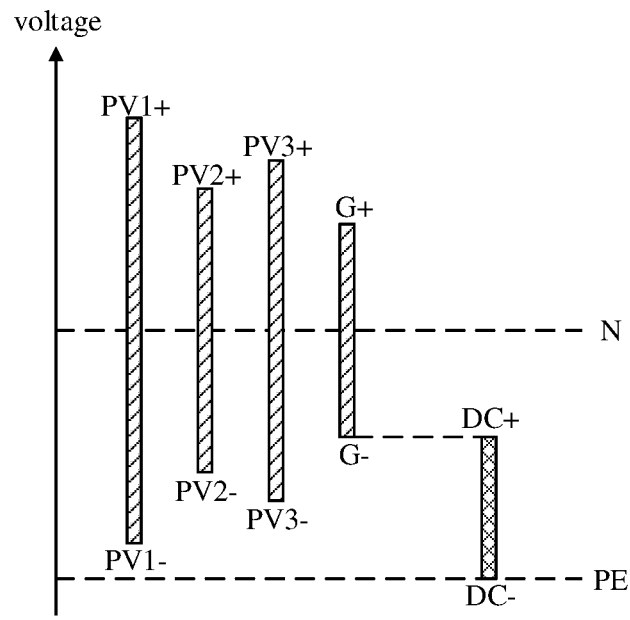
FIG. 3A is an effect diagram corresponding to FIG. 2B according to the present disclosure.

It is described in conjunction with FIG. 3a hereinafter that the device according to FIG. 2B may make the voltage to earth of the photovoltaic system positive.

It should be noted that, the photovoltaic system may include one converter, or multiple converters output terminals of which are connected in parallel. The description is made by taking a case that the photovoltaic system includes multiple converters and the converter is an inverter as an example.

It is assumed that, there are three inverters in the photovoltaic system, voltage ranges of the three inverters on a direct current side are respectively PV1+ to PV1−, PV2+ to PV2−, and PV3+ to PV3−, and amplitude of a voltage of a power grid ranges from G+ to G−, where N is a midpoint potential of the voltage of the power grid, and PV1− is the lowest voltage of the photovoltaic system. In the embodiment, the Buck-boost circuit 2001 is controlled to make a negative electrode DC− of a direct voltage of the output voltage of the Buck-boost circuit 2001 lower than PV1−. Since DC− is grounded, the voltage to earth of the photovoltaic system is completely positive.

For example, a voltage effective value in an alternating current phase of the photovoltaic system is 230V, a highest differential-mode voltage of the direct current is ΔPV1=1000V. A peak value of an alternating voltage is G+=230V*1.414=325V (relative to the point N), and PV1+=500V (relative to the point N) and PV1−=−500V (relative to the point N) on the direct current side. The output voltage of the inverter in the embodiment is DC+=G−=−325V (relative to the point N). In a case that the output voltage of the inverter is controlled to be Δ DC>175V, DC−=(DC+)−(ΔDC)<−500V (relative to the point N). Since DC− is grounded (PE), i.e., the voltage of the point N relative to PE is higher than 500V, the lowest voltage PV1− of the photovoltaic system relative to the ground is higher than zero.

Figure 3B:
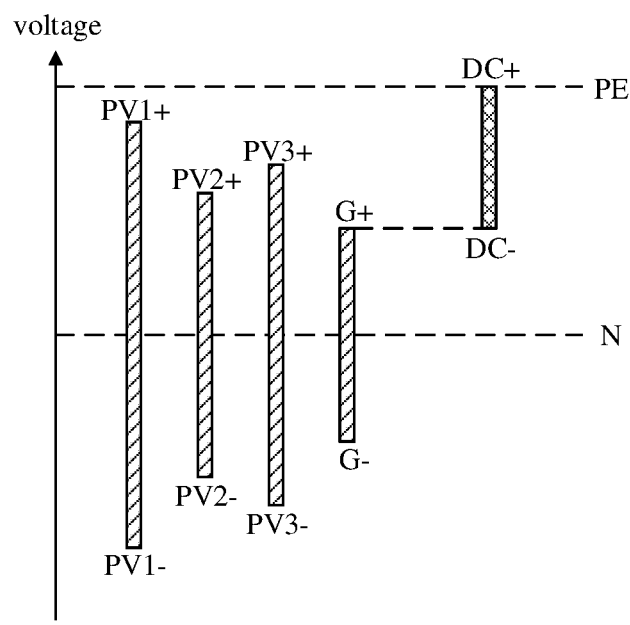
FIG. 3B is an effect diagram corresponding to FIG. 2A according to the present disclosure.

Similarly, reference can be made to FIG. 3B, which is an effect schematic diagram corresponding to FIG. 2A. It can be seen from FIG. 3B that, in a case that DC+ is grounded, the inverter is controlled to make a positive electrode DC+ of the direct voltage of the output voltage higher than PV1+. Since DC+ is grounded, the voltage to earth of the photovoltaic system is completely negative.

A third embodiment of a device is described below.

Figure 4A:
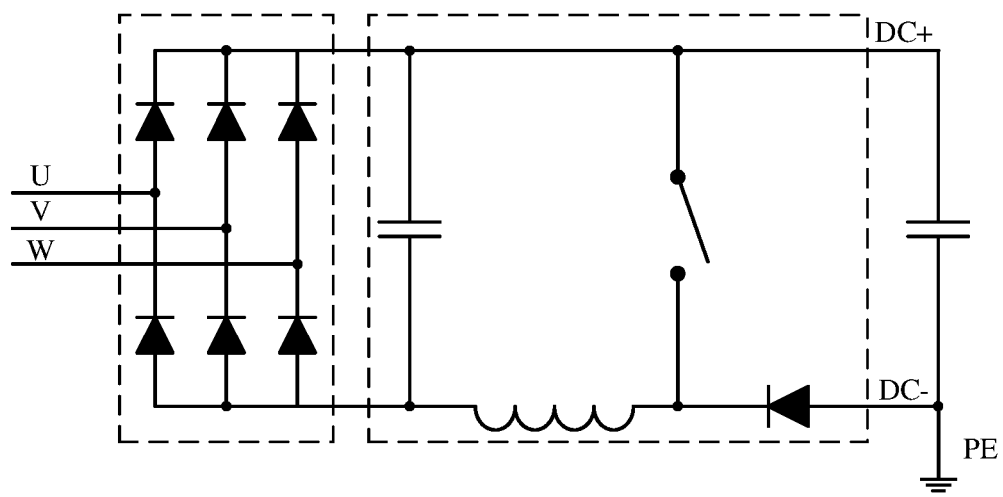
FIG. 4A is a schematic diagram of a device according to a third embodiment of the present disclosure.
Figure 4B:
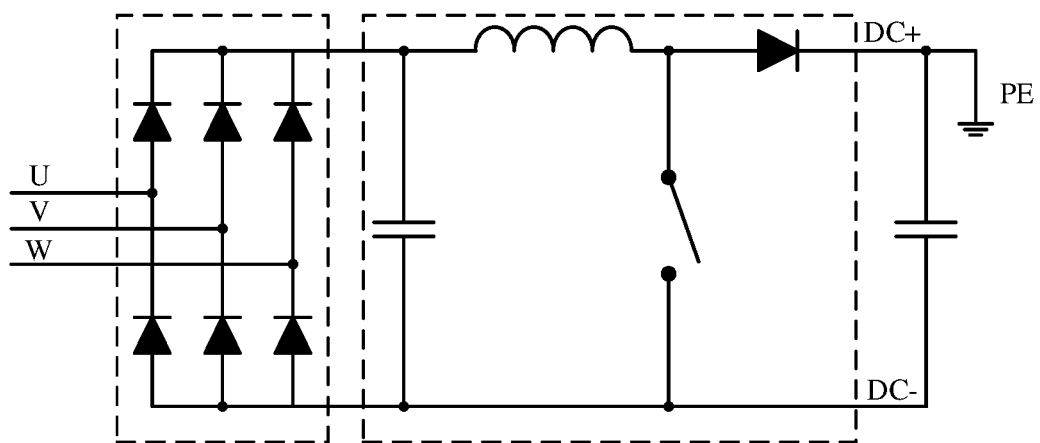
FIG. 4B is another schematic diagram of a device according to a third embodiment of the present disclosure.

Reference is made to FIG. 4A and FIG. 4B, which are schematic diagrams of a device according to a third embodiment of the present disclosure. Based on the device in the embodiment, in a case that an input terminal of the rectification module 100 is connected to an output terminal of the converter and the non-isolated voltage conversion module is a Boost circuit 2002, an output terminal of the Boost circuit 2002 is connected in parallel with the capacitor C. As shown in FIG. 4A, an output voltage of the non-isolated voltage conversion module is controlled to make a voltage to earth of the photovoltaic system positive, in a case that the negative electrode of the capacitor C is grounded. As shown in FIG. 4B, an output voltage of the non-isolated voltage conversion module is controlled to make the voltage to earth of the photovoltaic system negative, in a case that the positive electrode of the capacitor C is grounded.

Figure 5A:
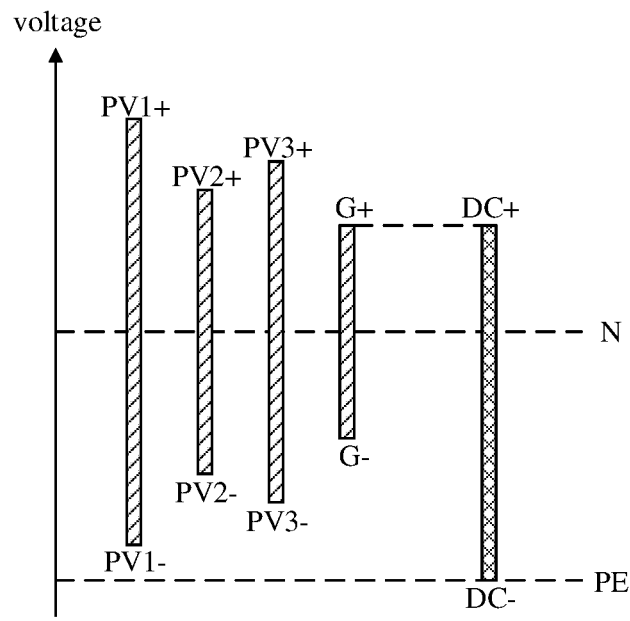
FIG. 5A is an effect diagram corresponding to FIG. 4A according to the present disclosure.

It is described in conjunction with FIG. 5A hereinafter that the device according to FIG. 4A may make the voltage to earth of the photovoltaic system positive.

It is assumed that, there are three inverters connected in parallel in the photovoltaic system, voltage ranges of the three inverters on a direct current side are respectively PV1+ to PV1−, PV2+ to PV2−, and PV3+ to PV3−, and amplitude of a voltage of a power grid ranges from G+ to G−, where N is a midpoint potential of the voltage of the power grid, and PV1− is the lowest voltage of the photovoltaic system. In the embodiment, the Boost circuit is controlled to make a negative electrode DC− of a direct voltage of the output voltage of the Boost circuit lower than PV1−. Since DC− is grounded, the voltage to earth of the photovoltaic system is completely positive.

For example, a voltage effective value in an alternating current phase of the photovoltaic system is 230V, a highest differential-mode voltage of the direct current is ΔPV1=1000V. A peak value of an alternating voltage is G+=230V*1.414=325V (relative to the point N), and PV1+= 500V (relative to the point N) and PV1−=−500V (relative to the point N) on the direct current side. The output voltage of the inverter in the embodiment is DC+=G+=325V (relative to the point N). In a case that the output voltage of the converter is controlled to be ΔDC>825V, DC−=(DC+)− (ΔDC)<−500V (relative to the point N). Since DC− is grounded (PE), i.e., the voltage of the point N relative to PE is higher than 500V, the lowest voltage PV1− of the photovoltaic system relative to the ground is higher than zero.

Figure 5B:
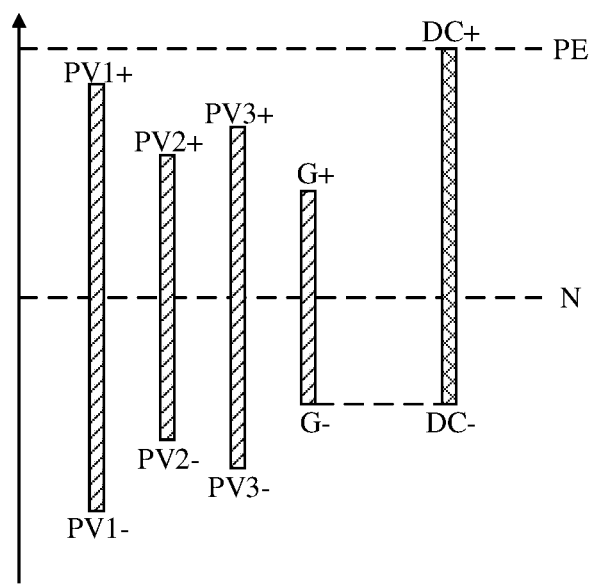
FIG. 5B is an effect diagram corresponding to FIG. 4B according to the present disclosure.

Similarly, reference can be made to FIG. 5B, which is an effect schematic diagram corresponding to FIG. 4B. It can be seen from FIG. 5B that, in a case that DC+ is grounded, the inverter is controlled to make a positive electrode DC+ of the direct voltage of the output voltage higher than PV1+. Since DC+ is grounded, the voltage to earth of the photovoltaic system is completely negative.

A fourth embodiment of a device is described below.

Figure 6A:
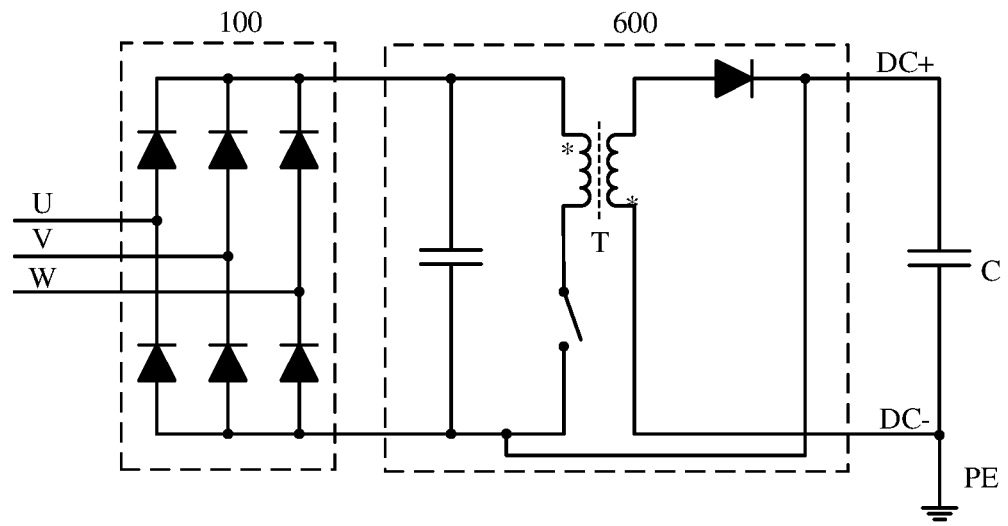
FIG. 6A is a schematic diagram of a device according to a fourth embodiment of the present disclosure.
Figure 6B:
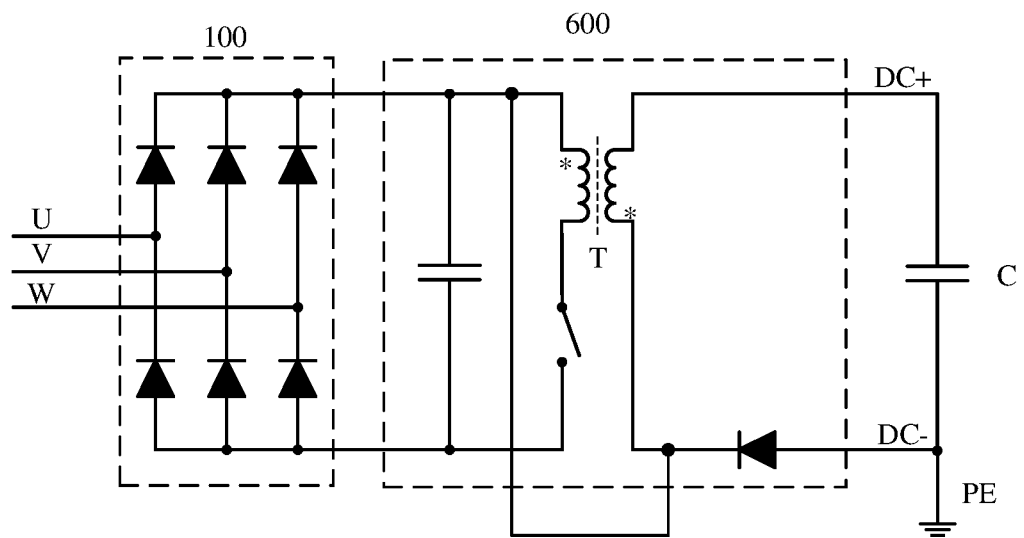
FIG. 6B is another schematic diagram of a device according to a fourth embodiment of the present disclosure.

Reference is made to FIG. 6a and FIG. 6b, which are schematic diagrams of a device according to a fourth embodiment of the present disclosure. In a case that the input terminal of the rectification module is connected to the output terminal of the converter, the non-isolated voltage conversion module is a non-isolated DC-DC converter based on a high-frequency transformer, and the non-isolated DC-DC converter includes any one of a forward converter, a fly-back converter, an LLC converter, a half-bridge non-isolated converter, a full-bridge non-isolated converter and a push-pull converter. An input negative electrode and an output positive electrode of the non-isolated DC-DC converter are connected, or an input positive electrode and an output negative electrode of the non-isolated DC-DC converter are connected.

It can be understood that the high frequency transformer is relative to the power frequency transformer.

It should be noted that in the embodiment the non-isolated voltage conversion module may be implemented by an isolated DC-DC converter, which may be changed into a non-isolated voltage conversion module as long as the isolation of the isolated DC-DC converter is destroyed. An input terminal and an output terminal of the isolated DC-DC converter may be connected to destroy the isolation of the isolated DC-DC converter. For example, the input positive electrode and the output positive electrode of the isolated DC-DC converter are connected, or the input negative electrode and the output negative electrode of the isolated DC-DC converter are connected, or the input positive electrode and the output negative electrode of the isolated DC-DC converter are connected, or the input negative electrode and the output positive electrode of the isolated DC-DC converter are connected.

Reference is made FIG. 6A, in a case that the isolated DC-DC converter is the fly-back converter, an input negative electrode and an output positive electrode of the fly-back converter are connected, an output terminal of the fly-back converter is connected in parallel with the capacitor, and the negative electrode of the capacitor is grounded. It should be noted that, in a case that the input negative electrode and the output positive electrode of the fly-back converter 600 are connected, the isolation of the fly-back converter 600 is destroyed, and the fly-back converter 600 equals to a non-isolated converter. The voltages to earth of the photovoltaic system may be completely positive by controlling the output voltage of the fly-back converter.

Reference is made FIG. 6b, in a case that the isolated DC-DC converter is the fly-back converter, an input positive electrode and an output negative electrode of the fly-back converter are connected, an output terminal of the fly-back converter is connected in parallel with the capacitor, and the negative electrode of the capacitor is grounded. The voltages to earth of the photovoltaic system may be completely negative by controlling the output voltage of the fly-back converter.

A fifth embodiment of a device is described below.

Figure 7:
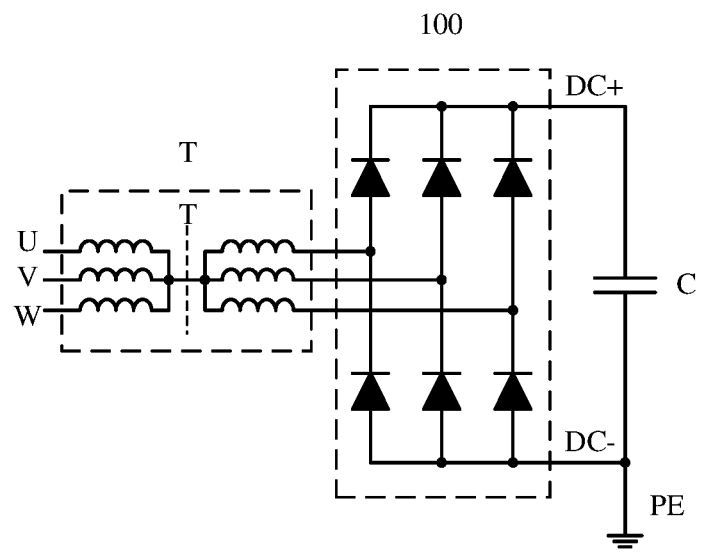
FIG. 7 is a schematic diagram of a device according to a fifth embodiment of the present disclosure.

Reference is made to FIG. 7, which is a schematic diagram of a device according to a fifth embodiment of the present disclosure. For the device according to the embodiment, in a case that the non-isolated voltage conversion module is connected to the output terminal of the converter, the non-isolated voltage conversion module is a power frequency transformer T. Both a primary side and a secondary side of the power frequency transformer T have Y-type structures, a neutral point of the primary side is connected with a neutral point of the secondary side, the primary side is connected to a power grid, and the secondary side is connected to the input terminal of the rectification module 100.

It should be noted that, the neutral point of the primary side is connected with the neutral point of the secondary side to destroy the isolation of the transformer T. In addition, the power frequency transformer as shown in FIG. 7 is a three phase transformer including three phases which are U, V and W.

In FIG. 7, a boosting ratio of the power frequency transformer is adjusted to make a voltage to earth of the photovoltaic system positive, in a case that the negative electrode of the capacitor C is grounded. The boosting ratio of the power frequency transformer is adjusted to make the voltage to earth of the photovoltaic system negative, in a case that the positive electrode of the capacitor C is grounded, which is not shown in the drawings.

It should be noted that, in the above embodiments, the positive electrode or the negative electrode of the capacitor C being grounded corresponds to a positive terminal DC+ or a negative terminal DC− of the output direct current being grounded respectively.

A sixth embodiment of a device is described below.

Figure 8:
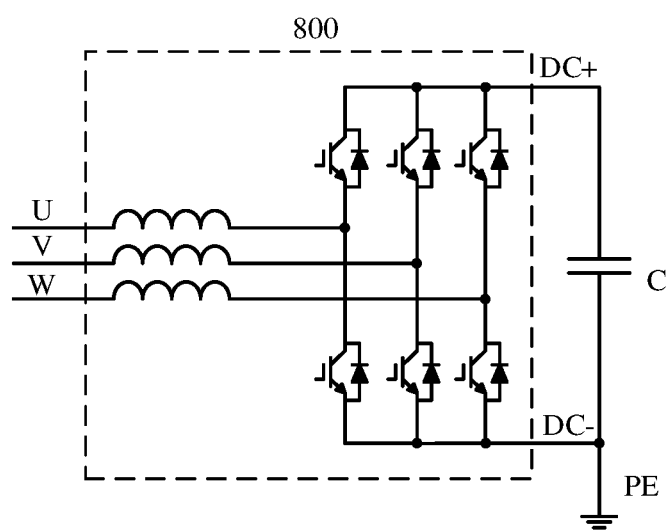
FIG. 8 is a schematic diagram of a device according to a sixth embodiment of the present disclosure.

Reference is made to FIG. 8, which is a schematic diagram of a device according to the sixth embodiment of the present disclosure. In the above embodiments, the rectification module and the non-isolated voltage conversion module are implemented by different circuits. In this embodiment, the rectification module and the non-isolated voltage conversion module are not separated, but implemented by one circuit, that is, a PWM rectifier 800. The device according to the embodiment is connected between an alternating current output terminal of a converter and a grid-connected power frequency transformer in a photovoltaic system. The device includes a rectification module, a non-isolated voltage conversion module and at least one capacitor. The rectification module and the non-isolated voltage conversion module are implemented by the PWM rectifier 800. An input terminal of the PWM rectifier 800 is connected to an output terminal of the converter. The PWM rectifier 800 is configured to rectify an alternating current outputted by the converter into a direct current and perform voltage conversion on the alternating current, and the voltage conversion is boost conversion. The capacitor C is connected in parallel with an output terminal of the direct current, and either a positive electrode or a negative electrode of the capacitor C is grounded.

Figure 9:
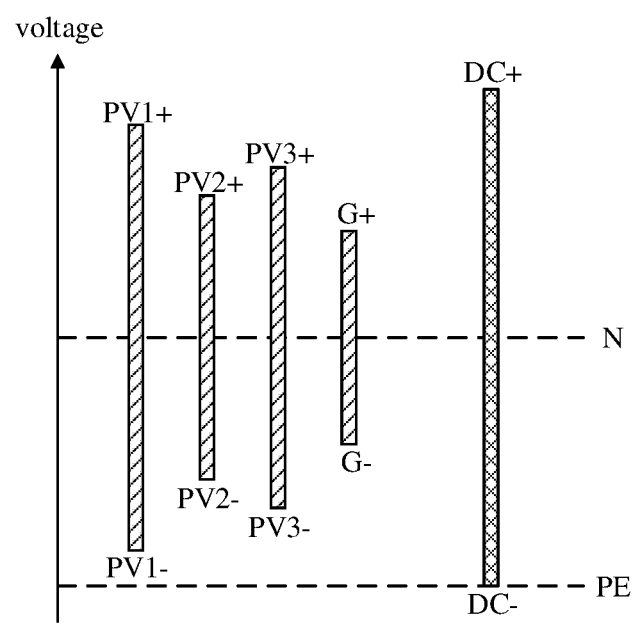
FIG. 9 is an effect diagram corresponding to FIG. 8 according to the present disclosure.

FIG. 8 shows a case that the negative electrode of the capacitor C is grounded. In this case, the output voltage of the non-isolated voltage conversion module is controlled to make the voltage to earth of the whole photovoltaic system completely positive, for details of which FIG. 9 may be referred. Similarly, the output voltage of the non-isolated voltage conversion module is controlled to make the voltage to earth of the whole photovoltaic system completely negative, in a case that the positive electrode of the capacitor C is grounded, Based on the device for suppressing potential induced degradation according the above embodiments, a photovoltaic system is further provided according to the present disclosure, which will be described below in detail in conjunction with drawings.

Figure 10:
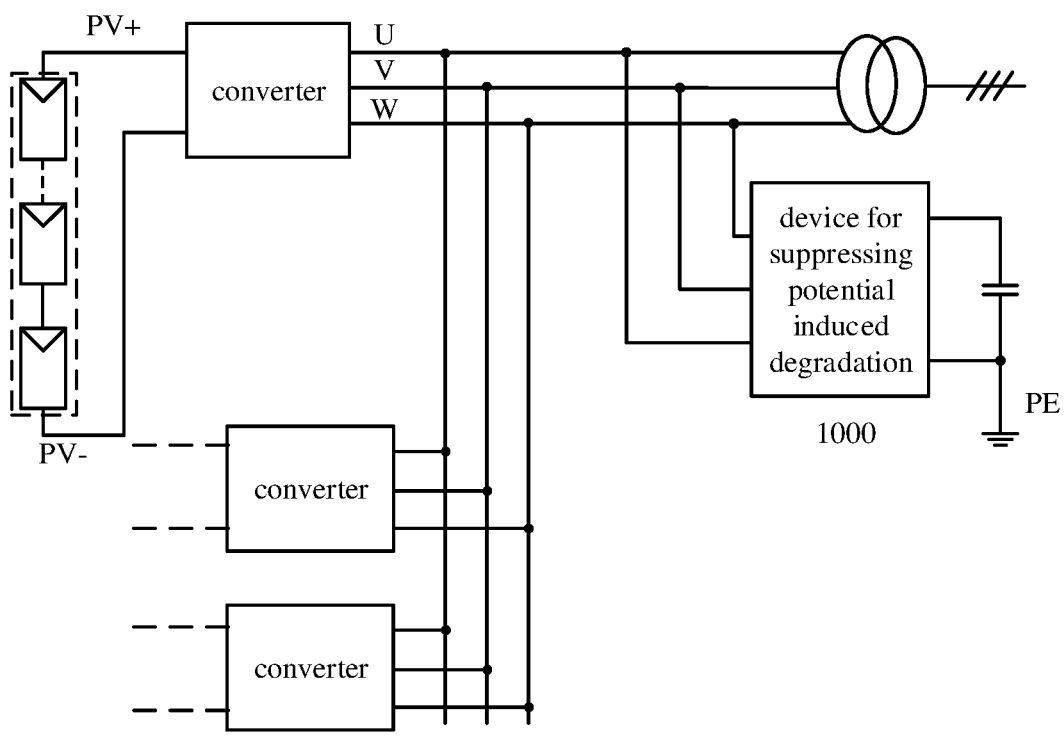
FIG. 10 is a schematic diagram of a photovoltaic system according to an embodiment of the present disclosure.

Reference is made to FIG. 10, which is a schematic diagram of a photovoltaic system according to an embodiment of the present disclosure. The photovoltaic system according to the embodiment includes the device for suppressing potential induced degradation according to the above embodiments, and a PV array, a converter and a transformer. It should be noted that the PV array is a photovoltaic array. The PV array may include multiple photovoltaic solar panels, which are connected in series, or connected in parallel, or connected in series and in parallel. The PV array is connected to an input terminal of the converter, an output terminal of the converter is connected to an input terminal of the transformer, and an output terminal of the transformer is connected to a power grid or a load. The number of converters is one or the number of converters is two or more. In a case that the number of the converters is two or more, an input terminal of each of the converters is connected to one PV array, output terminals of all the converters are connected in parallel, and then the output terminals of all the converters are connected with the input terminal of the transformer.

Reference is made to FIG. 10, which takes an example that there are multiple converters, and that the output terminals of all the converters are connected in parallel. A positive output terminal of the device 1000 is grounded, which may ensure voltages to earth of the whole photovoltaic system to be negative. In a case that a negative output terminal of the device 1000 is grounded, it may be ensured that the voltages to earth of the whole photovoltaic system to be positive.

It should be noted that, in a case that the converter is a multi-stage converter, for example, a two-stage converter including a DC-DC converter and a DC-AC converter, PV+ and PV− of a direct current of the converter will be no longer symmetrical with respect to the N point when the front-stage DC-DC converter operates. However, the effect of suppressing PID can be achieved, as long as the device according to the present disclosure forms a lowest potential or a highest potential of the photovoltaic system at a direct output terminal, and a terminal corresponding to an output capacitor is grounded. Therefore, the present disclosure is equally applicable in a case of the multi-stage converter, or in other case that PV+ and PV− of the direct current are asymmetric with respect to the N point.

It should be noted that the above-described device for suppressing potential induced degradation may further include a current limiting circuit, which may be connected in series between an output terminal on the direct current side and the ground. In addition, the current limiting circuit is located in the device, is connected in series with any of circuits in the device, and plays a role in limiting a current. The current limiting circuit includes at least one of a resistor and an inductor. It can be understood that the current limiting circuit may be only a resistor, or only an inductor, or resistors and inductors connected in series, or resistors and inductors connected in parallel, or resistors and inductors connected in series and in parallel.

The current limiting circuit in the embodiment is to suppress a leakage current of the photovoltaic system flowing through the device, and to suppress a transient overcurrent when the device for suppressing potential induced degradation is newly connected to the photovoltaic system, or to prevent an current outputted by a compensation power supply from being too large in a case that impedance to earth of the photovoltaic system is too low.

In addition, the device for suppressing potential induced degradation according to the embodiment of the present disclosure may further include a switch or a fuse. Both the switch and the fuse are for protection in a case of an accident, and are connected in series between the device and the power grid. For example, the fuse may play a protective role by fusing timely in the case of over-current. The switch is turned off in a case that a current is large, or keeps in an off state to the photovoltaic system before the device for suppressing potential induced degradation is powered on.

In addition, the device for suppressing potential induced degradation is close to the power grid, and a surge protection circuit is provided in consideration of the influence of the surge on the power grid side. That is, the device may further include the surge protection circuit, which may be connected in series between the device and the power grid.

The foregoing embodiments are only preferred embodiments of the present disclosure and are not meant to limit the present disclosure in any forms. Although the preferred embodiments are disclosed as above for description of the present disclosure, these embodiments are not meant to limit the present disclosure. Many possible variations and modifications, or equivalent embodiments modified by equivalent transformations can be made in the technical solutions of the present disclosure by any those skilled in the art by using the methods and technical contents disclosed in the above without departing from the scope of the technical solutions of the present disclosure. Any simple modifications, equivalent transformations and modifications made based on the technical essence of the present disclosure without departing from the contents of the technical solutions of the present disclosure shall fall within the protection scope of the technical solutions of the present disclosure.

The invention claimed is:

1. A device for suppressing potential induced degradation, connected between an alternating current output terminal of a converter and a grid-connected power frequency transformer in a photovoltaic system, comprising:
   a rectification circuit, wherein an input terminal of the rectification circuit is connected to an output terminal of the converter, and the rectification circuit is configured to rectify an alternating current outputted by the converter into a direct current;
   a non-isolated voltage conversion circuit, wherein the non-isolated voltage conversion circuit is a non-isolated direct current to direct current (DC-DC) converter based on a high-frequency transformer, an input terminal and an output terminal of the non-isolated DC-DC converter are directly connected by a wire, the input terminal of the non-isolated DC-DC converter is connected to an output terminal of the rectification circuit, the non-isolated voltage conversion circuit is configured to perform voltage conversion on the direct current outputted by the rectification circuit, and the voltage conversion is boost conversion or voltage reverse conversion; and
   at least one capacitor, wherein the capacitor is connected in parallel with an output terminal of the direct current, and either a positive electrode or a negative electrode of the capacitor is directly grounded;
   wherein the output terminal of the non-isolated DC-DC converter is connected in parallel with the grounded capacitor;
   wherein the non-isolated DC-DC converter comprises a fly-back converter, wherein an input negative electrode and an output positive electrode of the fly-back converter are directly connected by a wire, an output terminal of the fly-back converter is connected in parallel with the capacitor, and the negative electrode of the capacitor is directly grounded; or an input positive electrode and an output negative electrode of the fly-back converter are directly connected by a wire, an output terminal of the fly-back converter is connected in parallel with the capacitor, and the negative electrode of the capacitor is directly grounded.

2. The device for suppressing potential induced degradation according to claim 1, wherein the rectification circuit is an uncontrolled rectification bridge.

3. A photovoltaic system, comprising a device for suppressing potential induced degradation, and a photovoltaic (PV) array, a converter and a transformer, wherein
   the PV array is connected to an input terminal of the converter, an output terminal of the converter is connected to an input terminal of the transformer, and an output terminal of the transformer is connected to a power grid or a load,
   the device for suppressing potential induced degradation is connected between an alternating current output terminal of a converter and a grid-connected power frequency transformer in a photovoltaic system, and the device for suppressing potential induced degradation includes:
   a rectification circuit, wherein an input terminal of the rectification circuit is connected to an output terminal of the converter, and the rectification circuit is configured to rectify an alternating current outputted by the converter into a direct current;
   a non-isolated voltage conversion circuit, wherein the non-isolated voltage conversion circuit is a non-isolated direct current to direct current (DC-DC) converter based on a high-frequency transformer, an input terminal and an output terminal of the non-isolated DC-DC converter are directly connected by a wire, the input terminal of the non-isolated DC-DC converter is connected to an output terminal of the rectification circuit, the non-isolated voltage conversion circuit is configured to perform voltage conversion on the direct current outputted by the rectification circuit, and the voltage conversion is boost conversion or voltage reverse conversion; and
   at least one capacitor, wherein the capacitor is connected in parallel with an output terminal of the direct current, and either a positive electrode or a negative electrode of the capacitor is directly grounded;
   wherein the output terminal of the non-isolated DC-DC converter is connected in parallel with the grounded capacitor;
   wherein the non-isolated DC-DC converter comprises a fly-back converter, wherein an input negative electrode and an output positive electrode of the fly-back converter are directly connected by a wire, an output terminal of the fly-back converter is connected in parallel with the capacitor, and the negative electrode of the capacitor is directly grounded; or an input positive electrode and an output negative electrode of the fly-back converter are directly connected by a wire, an output terminal of the fly-back converter is connected in parallel with the capacitor, and the negative electrode of the capacitor is directly grounded.

4. The photovoltaic system according to claim 3, wherein the number of converters is one or the number of converters is two or more; and
   in a case that the number of the converters is two or more, an input terminal of each of the converters is connected to one PV array, output terminals of all the converters are connected in parallel, and then the output terminals of all the converters are connected with the input terminal of the transformer.

5. The photovoltaic system according to claim 3, wherein the rectification circuit is an uncontrolled rectification bridge.

* * * * *